United States Patent
Lu et al.

(10) Patent No.: US 9,369,510 B2
(45) Date of Patent: Jun. 14, 2016

(54) COST AND RESOURCE UTILIZATION OPTIMIZATION IN MULTIPLE DATA SOURCE TRANSCODING

(75) Inventors: Ligang Lu, New City, NY (US); Vadim Sheinin, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1666 days.

(21) Appl. No.: 12/504,074

(22) Filed: Jul. 16, 2009

(65) Prior Publication Data
US 2011/0013709 A1 Jan. 20, 2011

(51) Int. Cl.
*H04L 29/06* (2006.01)

(52) U.S. Cl.
CPC ............. *H04L 65/605* (2013.01); *H04L 65/60* (2013.01)

(58) Field of Classification Search
CPC ........................................................ H04L 65/60
USPC ........................................................ 709/227
See application file for complete search history.

(56) References Cited

U.S. PATENT DOCUMENTS

| | | | |
|---|---|---|---|
| 6,532,593 B1 * | 3/2003 | Moroney ....................... | 725/142 |
| 6,642,967 B1 | 11/2003 | Saunders | |
| 6,741,608 B1 * | 5/2004 | Bouis et al. ................... | 370/465 |
| 7,221,857 B2 * | 5/2007 | Zimmermann ............... | 386/200 |
| 2003/0037160 A1 | 2/2003 | Wall et al. | |
| 2005/0157660 A1 * | 7/2005 | Mandato et al. .............. | 370/254 |
| 2005/0276284 A1 * | 12/2005 | Krause et al. ................. | 370/538 |
| 2006/0133775 A1 | 6/2006 | Ju | |
| 2006/0168637 A1 | 7/2006 | Vysotsky et al. | |
| 2007/0002865 A1 * | 1/2007 | Burks et al. ................ | 370/395.2 |
| 2008/0001791 A1 | 1/2008 | Wanigasekara-Mohotti et al. | |
| 2009/0041155 A1 * | 2/2009 | Sugai ................... | G06Q 20/102 375/299 |
| 2010/0125529 A1 * | 5/2010 | Srinivasan ........... | G06Q 30/018 705/317 |

FOREIGN PATENT DOCUMENTS

EP 1 102 493 B1 2/2007

* cited by examiner

*Primary Examiner* — Asghar Bilgrami
(74) *Attorney, Agent, or Firm* — Jennifer R. Davis; Ryan, Mason & Lewis, LLP

(57) ABSTRACT

A plurality of input data streams, from a plurality of data sources, are identified. The input data streams are in a plurality of different formats. For each of the input data streams, one of a plurality of transcoders is selected, to obtain a transcoding plan. Each of the plurality of transcoders has an associated transcoding cost. A potential output for each of the plurality of transcoders has an associated storage cost, and the selecting step includes jointly reducing the overall cost, subject to appropriate constraints. The method can be employed, for example, for designing a new system or efficiently utilizing an existing system. The plurality of streams can be transcoded in accordance with the plan.

21 Claims, 2 Drawing Sheets

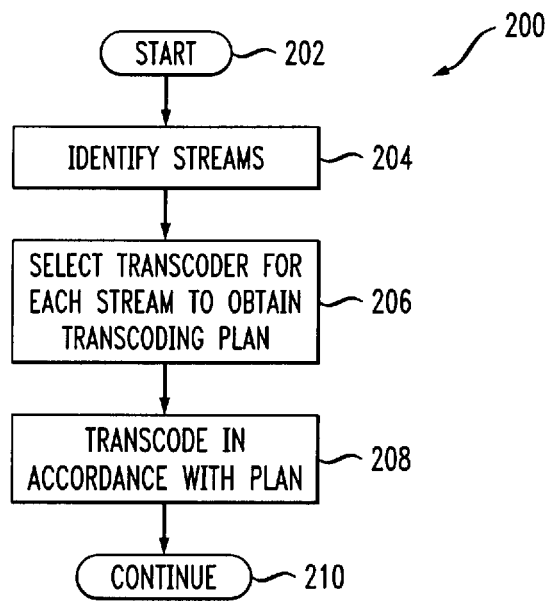
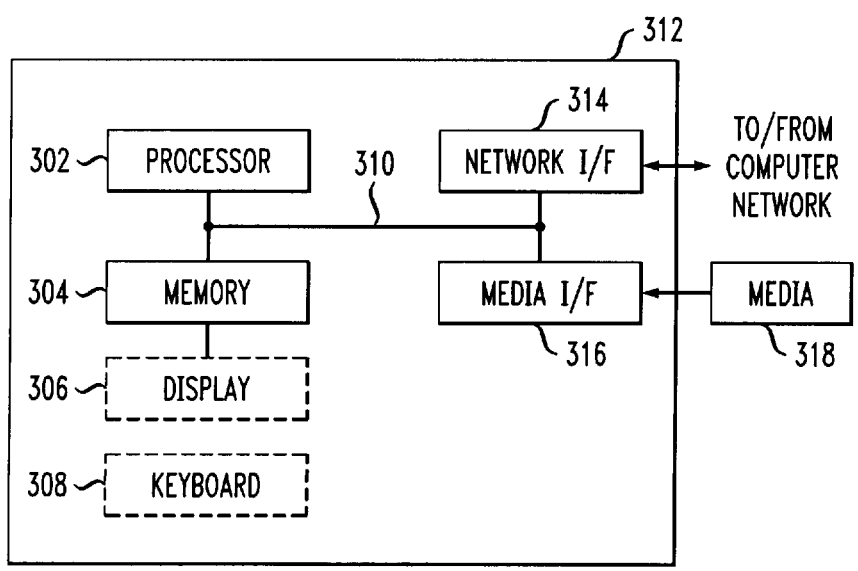

COST AND RESOURCE UTILIZATION OPTIMIZATION IN MULTIPLE DATA SOURCE TRANSCODING

FIELD OF THE INVENTION

The present invention relates to the electrical, electronic and computer arts, and, more particularly, to transcoding data sources and the like.

BACKGROUND OF THE INVENTION

In applications wherein one or more sources of data with different data formats need to be transcoded and stored, the problem of how to optimally utilize the available transcoding resources and storage space and/or to minimize the over all transcoding and storage cost, subject to the given storage time and fidelity requirements, becomes very important and non-trivial. Such applications include large scale video surveillance systems, multimedia databases, and data processing centers.

US Patent Application Publication 2007/0002865 of Burks et al. discloses a method and system for optimizing transcoder resources. The method includes receiving one or more SDP offers. The method further includes filtering out media types from each of the one or more SDP offers based on a rating range. Further, the method includes selecting one of the media types from each of the one or more SDP offers. The method further includes allocating resources of one or more transcoders for transcoding the one of the media types.

US Patent Application Publication 2003/0037160 of Wall et al. discloses a method and apparatus for adaptably providing data to a network environment. The computational service provider is configured to prepare and transmit one or more data streams through a viable interconnection fabric to multiple HIDs. The data stream is configured by the computational service provider to adaptably meet the performance needs of the HID receiving the data stream. This enables multiple HIDs to receive variants of the same data stream that may differ in quantity, quality, and/or data format. In one embodiment of the invention, a decode module prepares data for transport by separating decoded data into individual processes. Before an HID may connect to a process the HID is authenticated. The processes are further adjusted by a resource optimization module to take into account the characteristics of each HID requesting access. The resource optimization module also takes into account the characteristics of the interconnection fabric coupling the HID and the computational service provider.

US Patent Application Publication 2005/0157660 of Mandato et al. discloses a model for enforcing different phases of the End-to-End Negotiation Protocol (E2ENP) aiming QoS support for multi-stream and multimedia applications, generally related to the field of mobile computing in a networking environment with distributed multimedia applications and technologies. More specifically, it is directed to the concept of the End-to-End Negotiation Protocol (E2ENP) phases, which enable a pre-negotiation, fast negotiation and a fast, dynamic renegotiation of the end-to-end quality and capabilities for telecommunication sessions, for multiple configurations of two or a multiplicity of end peers and/or intermediate components in a consistent, reliable, and incremental way by enabling the mobile users' applications to efficiently and timely react to QoS violations. In this context, the invention proposes a model for defining user profiles and terminal capability information in such a way that hierarchical QoS contract specifications, e.g. compelling correlations across different sets of QoS contracts for related media streams, can be enforced and used for deriving negotiable information. As a reference implementation of this concept, this invention proposes a novel usage of the Session Initiation Protocol (SIP) standardized by the Internet Engineering Task Force (IETF) in conjunction with extensions of the Session Description Protocol Next Generation (SDPng) specification based on the Extensible Markup Language (XML) in order to implement concepts of the End-to-End QoS Negotiation Protocol (E2ENP).

SUMMARY OF THE INVENTION

Principles of the present invention provide techniques for cost and resource utilization enhancement, and even optimization, in multiple data source transcoding. In one aspect, an exemplary method (which can be computer implemented) includes the steps of identifying a plurality of input data streams from a plurality of data sources, the input data streams being in a plurality of different formats; and selecting, for each of the input data streams, one of a plurality of transcoders, to obtain a transcoding plan, each of the plurality of transcoders having an associated transcoding cost. A potential output for each of the plurality of transcoders has an associated storage cost. The selecting step includes jointly reducing an overall cost, subject to appropriate constraints.

The method can be employed, for example, for designing a new system or efficiently utilizing an existing system. The plurality of streams can be transcoded in accordance with the plan.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits: joint improvement of resource utilization of the available transcoding and storage resources over multiple sources and/or reduction in the overall transcoding and storage deployment cost subject to the storage requirements. Non-limiting specific examples include less installment or better utilization of transcoding units and storage space; the transcoded data will also reduce the transmission bandwidth and time needed in post-processing, These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 2 shows a flow chart of an exemplary method, according to another aspect of the invention; and FIG. 3 depicts a computer system that may be useful in implementing one or more aspects and/or elements of the invention.

DETAILED DESCRIPTION OF PREFERRED EMBODIMENTS

Figure 1:
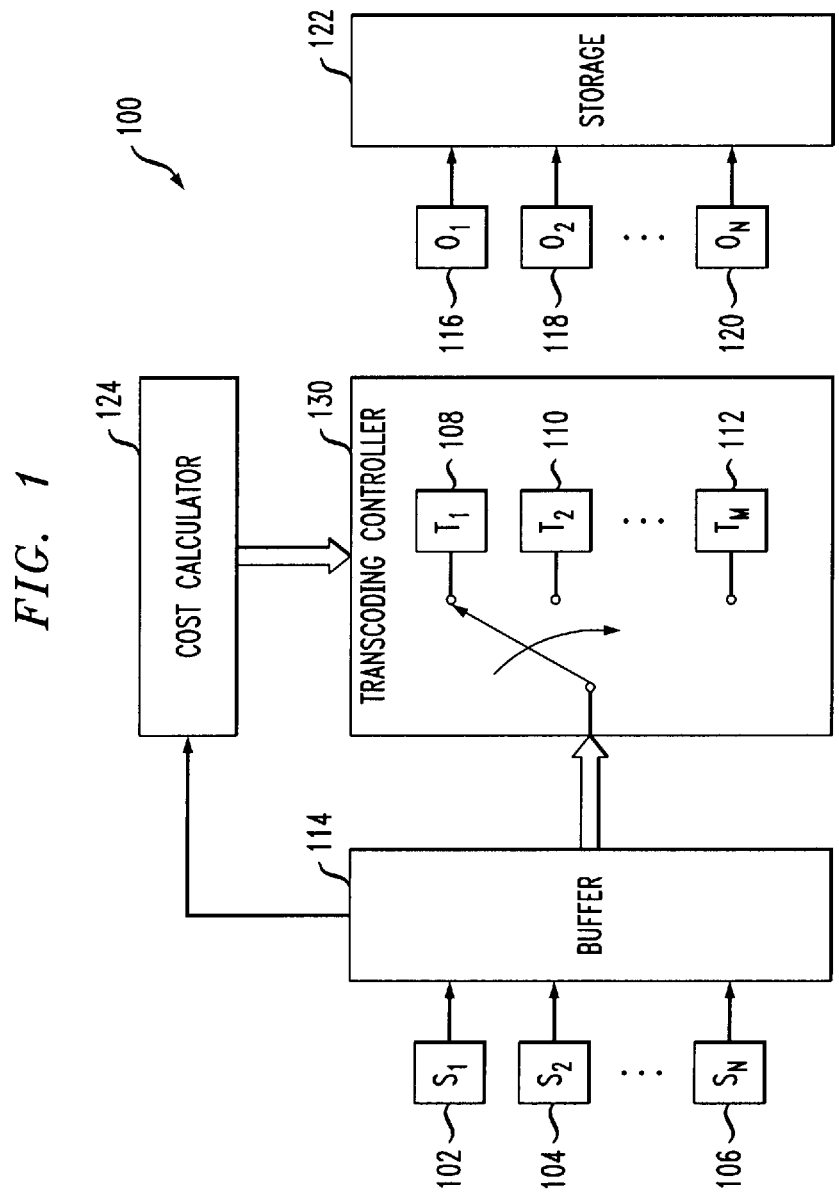
FIG. 1 shows an exemplary embodiment of a transcoding system, according to an aspect of the invention.

One or more current solutions either try only to minimize the output file size at the given quality, or attempt to keep the best quality for the given output file size. The overall transcoding and storage cost or the overall utilization of the available resources is not addressed or considered. Advantageously, one or more embodiments of the invention take storage time and resource expense into account. Furthermore, one or more embodiments of the invention do not merely consider the transcoding of the input data sources individually; rather, a new approach is taken, to jointly consider multiple data source inputs and take some, and preferably all, operation cost related factors (transcoding, storage size, storage time duration, etc.) into account. Consequently, aspects of the invention provide techniques to jointly minimize the overall operation cost and optimally utilize the available resources. Furthermore, current techniques typically do not address how to reduce the overall cost of processing and storage or how to efficiently utilize the available transcoding and storage resources in the various settings of transcoding and storing multiple data sources.

As seen in FIG. 1, which depicts an exemplary system 100, for N input data streams $S_1, S_2, \ldots, S_N$, numbered 102, 104, 106, the system determines which of a plurality of transcoders $T_1, T_2, \ldots, T_M$, numbered 108, 110, 112, should be applied to each stream 102, 104, 106. Given the available transcoding resources and given storage space, the objective is to determine, considering each input stream 102, 104, 106, a transcoding plan which includes a transcoder 108, 110, 112 and an operation quantizer (or an output rate), so as to jointly minimize the overall cost while satisfying the quality and storage requirements. An operation quantizer is typically located within each transcoder $T_1, T_2, \ldots, T_M$, and associates certain ranges of numbers with a particular subscript (a digitizer is a non-limiting example). For example, range zero to ten may associated with subscript one, range from just greater than ten, to twenty, may be associated with subscript two, and so on.

The data streams $S_1, S_2, \ldots, S_N$ may have different formats, i.e., some may be coded or compressed using some coding techniques such as Motion JPEG, MPEG-2, MPEG-4, H.264, etc.; others may be uncompressed (raw). The streams may be buffered in buffer 114. The determination regarding what transcoder should be applied to what stream can be based, for example, on the required storage time length (i.e., the length of time that the transcoded data needs to be stored; for example, the feed from a surveillance camera might be stored for three months) and the required minimum fidelity for each stream (e.g., some transcoding techniques might be so lossy that the required minimum fidelity could not be met) as well as the corresponding transcoding cost and storage cost. Storage cost is associated with the required storage resources; e.g., three months of surveillance camera feed at a certain data rate for the transcoded data gives the required size of the storage). Transcoding cost includes computational and other operational costs. Note that the streams may emanate from a number of different sources; e.g., multiple surveillance cameras. Further, each source may have one or more streams; for example, a single surveillance camera may have an audio stream and a video stream.

The input streams are routed to the correct transcoders by transcoding controller 130. The N input data streams $S_1, S_2, \ldots, S_N$, are transcoded to N outputs $O_1, O_2, \ldots, O_N$, numbered 116, 118, 120. The outputs of the transcoders are stored in storage 122. The cost data needed to make the transcoding decision can be determined by cost calculator 124 based on the buffered input streams.

Thus, in one or more embodiments, a system, method, and/or computer program product are provided for storage- and resource-cost efficient transcoding of N streams, compressed or uncompressed. Also, in one or more embodiments of the invention, all sources need not necessarily be transcoded, e.g. if a stream will only be stored for a very short time period and its file size is not large, it may be best not to transcode it. For instance, the incurred transcoding cost may outweigh the storage cost savings that could have been achieved through transcoding. The system 100 determines a transcoding plan, aiming to reduce, and preferably minimize, the overall storage and resource cost. Advantageously, it is possible, with one or more instances of the invention, to jointly improve the resource utilization over multiple streams and/or to reduce the overall storage and transcoding cost.

In an exemplary embodiment, cost efficient transcoding of one or multiple streams is achieved. System 100 determines the transcoding plan, including the output coding format and rate (or quality) for each of the streams 102, 104, 106, which will result in the lowest overall storage and transcoding cost, subject to the storage requirement and resource constraints. System 100 then conducts the transcoding according to the plan. Advantageously, in one or more embodiments, overall resource cost is considered in evolving the transcoding plan, and multiple streams with given resource constraints are treated jointly.

A non-limiting example application of one or more embodiments of the invention is Distributed Video Surveillance (DVS). The outputs of digital cameras may be, for example, either Motion JPEG compressed or MPEG-4 compressed. The outputs of analog cameras are typically uncompressed. The data volume in DVS applications is huge and resource cost is very significant if not properly compressed. Cost efficient transcoding methods and systems for archival are advantageous. Other non-limiting examples of volume intensive archive and/or storage centers include multimedia entertainment, medical applications, military applications, and the like. These are non-limiting examples of applications that may benefit from use of one or more exemplary embodiments of the invention, wherein overall storage and transcoding cost are considered jointly over multiple sources.

Embodiments of the invention are not limited to any particular minimization technique. More specifically, but without limiting the generality of the invention, the following description gives an example of how the cost can be calculated and minimized. For each input $S_i$, there is a set of Mj available transcoders $T_{Mj} = \{T_1, T_2, \ldots, T_{Mj}\}$, with different coding efficiencies (i.e., rate-distortion performance) and operation cost. By way of clarification, for a first input, say, $S_1$, there may be five possible transcoding options; for a second input, say, $S_2$, there may be three possible transcoding options, and so on. In one or more embodiments, denote as $C_{Tmj}(s_i)$ the associated operation cost of transcoding $S_i$ using $Tm_j$. Let c be the unit storage cost, i.e., the cost of storing one unit data for the period of one unit time. For each $S_i$, there are requirements for a minimum storage time length $L_j$, and a minimum stored data quality or a maximum distortion $D_j$. Let $|O_j|$ be the file size of Oj. The storage cost for $O_j$ can be calculated as:

$$C_S(O_j) = cL_j|O_j| \quad j=1,2,\ldots N. \quad (1)$$

If $S_j$ is a continuously flowing source and the transcoder output $O_j$s cannot be measured in a finite size, only a part of $O_j$ is stored (note that a continuously flowing source would require infinite storage if it were to be permanently stored). Let $R_j$ be the (output) bit rate of $O_j$, then the minimum storage space needed is $L_j R_j$ and the storage cost for $O_j$ is:

$$C_S(O_j) = cL_j^2 R_j \quad j=1,2\ldots,N. \quad (2)$$

Thus, the total cost for transcoding $S_j$ into $O_j$ and storing $O_j$ can be represented as:

$$C(S_j, O_j) = C_{T_i}(S_j) + C_S(O_j), j=1,2,\ldots,N \quad (3)$$

The overall cost of transcoding and storage for the N sources is:

$$C = \sum_{j=1}^{N} C(S_j, O_j) = \sum_{j=1}^{N} (C_{T_i}(S_j) + C_s(O_j)). \quad (4)$$

Minimum overall cost can be achieved through finding the set of parameter vectors $(T_j, R_j)$ for each $S_j$, $j=1, 2, \ldots, N$; such that:

$$C^* = \underset{T_{mj} \in T_{Mj}, R_j}{\mathrm{argmin}} C \quad \text{s.t.} \quad L_j, D_j; \quad j=1,2,\ldots,N. \quad (5)$$

To minimize the above equation, many optimization techniques can be applied, such as dynamic programming. Simple and effective methods can usually be employed, especially in practical applications wherein the number of available transcoders are not large and the transcoders' operational range for rates and quantizers are limited. Methods such as permutation and table-look-up can effectively find the solution. The operational rate-distortion performance or rate-quantizer characteristics for each transcoder can be tabulated in pre-tests.

The various embodiments of the invention described here can be applied to many different scenarios. For example, aspects of the invention are applicable to reduce the overall operational cost for existing or available transcoding and storage sources. Furthermore, one or more instances of the invention can be applied in the system planning and designing process for application specific transcoding and storage systems to reduce the overall deployment investment. Yet further, embodiments of the invention can be employed in resource sharing to efficiently make use of the existing resources.

Reference should now be had to flow chart 200 of FIG. 2, which depicts a method according to an aspect of the invention. After beginning at step 202, step 204 includes identifying a plurality of input data streams from a plurality of data sources; e.g., streams $S_1, S_2, \ldots, S_N$, numbered 102, 104, 106, as discussed above. The input data streams are, in general, in a plurality of different formats. For example, there may be five sources; a first source may have a stream in JPEG, a second may have a stream in MPEG, an third may be unencoded (raw), and so on; further, a source may have more than one stream (e.g., audio and video feed from a single surveillance camera). Step 206 includes selecting (for example, with controller 130 based on input from cost calculator 124), for each of the input data streams, one of a plurality of transcoders, such as transcoders $T_1, T_2, \ldots, T_M$, numbered 108, 110, 112, discussed above. Once a transcoder has been selected for each input, the result is a transcoding plan. Each of the plurality of transcoders has an associated transcoding cost, such as $C_{Tmi}(s_i)$, as discussed above. A potential output for each of the plurality of transcoders has an associated storage cost, such as $C_S(O_j)$, as discussed above (eventually, an appropriate one of the transcoders is selected for each input, and actual transcoding can be carried out in accordance with the transcoding plan, to obtain actual outputs, as discussed immediately below). Selecting step 206 includes jointly reducing the overall cost, subject to appropriate constraints (e.g., storage requirements, resources, and the like).

After the plan has been developed, optionally, the actual plurality of input data streams can be obtained and transcoded (for example, with appropriate ones of the transcoders 108, 110, 112) in accordance with the plan, as at step 208, to obtain a plurality of actual outputs. The plurality of actual outputs are transcoded versions of the plurality of input data streams. Processing continues at step 210.

In some instances, a deployed system, including the plurality of transcoders and at least one storage resource, already exists. In such a case, the overall cost includes operational cost, and step 206 is carried out to improve efficiency of utilization of the deployed system. The appropriate constraints may include, for example, storage fidelity and time length constraints.

In other cases, a deployed system including the plurality of transcoders and at least one storage resource does not already exist. In such a case, the overall cost includes deployment cost, and step 206 is carried out to determine a required number of the transcoders and a required size of the at least one storage resource. The appropriate constraints may include, for example, storage fidelity and time length constraints.

In some cases, the selecting step includes finding the set of parameter vectors $(T_j, R_j)$ for each $S_j$, $j=1, 2, \ldots, N$, as per equation (5) above.

In some cases, the constraints do not include a storage requirement, such that the associated storage costs may be taken as zero, and such that step 206 includes jointly reducing the transcoding costs. In this case, the input data streams are denoted as $S_j$, $j=1, 2, \ldots, N$; the potential outputs are denoted as $O_j$, $j=1, 2, \ldots, N$; and step 206 includes finding a set of parameter vectors $(T_j, R_j)$ for each $S_j$, $j=1, 2, \ldots, N$; such that:

$$C^* = \underset{T_{mj} \in T_{Mj}, R_j}{\mathrm{argmin}} C \quad \text{s.t.} \quad D_j; \quad j=1,2,\ldots,N. \quad (6)$$

C is given by:

$$C = \sum_{j=1}^{N} C(S_j, O_j) = \sum_{j=1}^{N} (C_{T_i}(S_j)). \quad (7)$$

$D_j$ is the maximum distortion allowed for a transcoded output of a given one of the $S_j$, and $C_{Ti}(S_j)$ is the associated operation cost of transcoding $S_j$ using $T_i$.

In some cases, storage resources already installed or to be deployed are dedicated resources, such that the associated storage costs are the deployment costs (e.g., the purchase costs) whether the storage resources are used or not. In these cases, step 206 includes finding a set of parameter vectors ($T_j$, $R_j$) for each $S_j$, j=1, 2, ..., N; such that:

$$C^* = \underset{T_{mj} \in T_{Mj}, R_j}{\text{argmin}}\ C \text{ s.t. } D_j; \quad j = 1, 2, \ldots, N. \qquad (8)$$

C is given by:

$$C = \sum_{j=1}^{N} C(S_j, O_j) = \sum_{j=1}^{N} (C_{T_i}(S_j) + C_S(O_j)) \qquad (9)$$

the storage costs are the unit cost multiplied by the storage size:

$$C_S(O_j) = c' L_j R_j, j=1,2\ldots,N; \text{ and} \qquad (10)$$

c' is the cost in unit data, e.g., in cents per bit.

In some cases, the constraints do not include a transcoding cost requirement, such that the associated transcoding costs may be taken as zero, and such that step 206 includes jointly reducing the storage costs. In these cases, step 206 includes finding a set of parameter vectors ($T_j$, $R_j$) for each $S_j$, j=1, 2, ..., N; such that:

$$C^* = \underset{T_{mj} \in T_{Mj}, R_j}{\text{argmin}}\ C \text{ s.t. } D_j; \quad j = 1, 2, \ldots, N. \qquad (11)$$

C is given by:

$$C = \sum_{j=1}^{N} C(S_j, O_j) = \sum_{j=1}^{N} (C_S(O_j)). \qquad (12)$$

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and transcoding the streams in accordance with a transcoding plan, may also be tied to physical sensors, such as cameras or microphones, from whence the data streams are obtained. Yet further, note that method steps herein may manipulate data stored in memory of a computer, and such data represents tangible items, such as which of a plurality of transcoders should be applied to data from a particular physical sensor.

It should be noted that any of the methods described herein can include an additional step of providing a system comprising distinct software modules embodied on a computer readable storage medium; the modules can include, for example, any or all of the components shown in FIG. 1 (for example, a cost calculator module, a transcoding controller module, and several transcoder modules). The method steps can then be carried out using the distinct software modules and/or submodules of the system, as described above, executing on one or more hardware processors 302. In some cases, specialized hardware may be employed to implement one or more of the transcoders 108, 110, 112. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising the steps of:
   identifying a plurality of input data streams from a plurality of data sources, said input data streams being in a plurality of different formats; and
   selecting, for each of said input data streams, one of a plurality of transcoders, to obtain a transcoding plan, each of said plurality of transcoders having an associated transcoding cost, a potential output for each of said plurality of transcoders having an associated storage cost, said selecting comprising jointly reducing an overall cost, subject to constraints, wherein said overall cost comprises said associated transcoding cost and said associated storage cost.

2. The method of claim 1, further comprising transcoding said plurality of input data streams in accordance with said transcoding plan to obtain a plurality of actual outputs, said plurality of actual outputs comprising transcoded versions of said plurality of input data streams.

3. The method of claim 1, wherein:
   said overall cost comprises operational cost;
   said selecting is carried out to improve efficiency of utilization of an existing deployed system comprising said plurality of transcoders and at least one storage resource; and
   said constraints comprise storage fidelity and time length constraints.

4. The method of claim 1, wherein:
   said overall cost comprises deployment cost;
   said selecting is carried out to determine a required number of said transcoders and a required size of at least one storage resource in a system to be deployed; and
   said constraints comprise storage fidelity and time length constraints.

5. The method of claim 1, where said constraints do not include a storage requirement, such that said associated storage costs may be taken as zero, and such that said selecting comprises jointly reducing said transcoding costs.

6. The method of claim 1, wherein said constraints do not include a transcoding, cost requirement, such that said associated transcoding costs may be taken as zero, and wherein said selecting step comprises jointly reducing said storage costs.

7. The method of claim 6, wherein said selecting step comprises finding a set of parameter vectors $(T_j, R_j)$ for each $S_j$, j=1, 2, ..., N, such that:

$$C^* = \underset{T_{mj} \in T_{Mj}, R_j}{\operatorname{argmin}} C \text{ s.t. } D_j; \quad j = 1, 2, L, N;$$

wherein:

$$C = \sum_{j=1}^{N} C(S_j, O_j) = \sum_{j=1}^{N} (C_S(O_j)).$$

8. A computer program product comprising a non-transitory computer readable storage medium having computer readable program code embodied therewith, said computer readable program code comprising:
   computer readable program code configured to identify a plurality of input data streams from a plurality of data sources, said input data streams being in a plurality of different formats; and computer readable program code configured to select, for each of said input data streams, one of a plurality of transcoders, to obtain a transcoding plan, each of said plurality of transcoders having an associated transcoding cost, a potential output for each of said plurality of transcoders having an associated storage cost, said selecting comprising jointly reducing an overall cost, subject to constraints, wherein said overall cost comprises said associated transcoding cost and said associated storage cost.

9. The computer program product of claim 8, further comprising computer readable program code configured to transcode said plurality of input data streams in accordance with said transcoding plan to obtain a plurality of actual outputs, said plurality of actual outputs comprising transcoded versions of said plurality of input data streams.

10. The computer program product of claim 8, wherein:
    said overall cost comprises operational cost;
    said computer readable program code for selecting comprises computer readable program code to improve efficiency of utilization of an existing deployed system comprising said plurality of transcoders and at least one storage resource; and
    said constraints comprise storage fidelity and time length constraints.

11. The computer program product of claim 8, wherein:
    said overall cost comprises deployment cost;
    said computer readable program code configured to select comprises computer readable program code configured to determine a required number of said transcoders and a required size of at least one storage resource in a system to be deployed; and
    said constraints comprise storage fidelity and time length constraints.

12. The computer program product of claim 8, where said constraints do not include a storage requirement, such that said associated storage costs may be taken as zero, and such that said computer readable program code configured to select comprises computer readable program code configured to jointly reduce said transcoding costs.

13. The computer program product of claim 8, wherein said constraints do not include a transcoding cost requirement, such that said associated transcoding costs may be taken as zero, and wherein said computer readable program code configured to select comprises computer readable program code configured to jointly reduce said storage costs.

14. An apparatus comprising:
a memory; and
at least one processor, coupled to said memory, and operative to
identify a plurality of input data streams from a plurality of data sources, said input data streams being in a plurality of different formats; and
select, for each of said input data streams, one of a plurality of transcoders, to obtain a transcoding plan, each of said plurality of transcoders having an associated transcoding cost, a potential output for each of said plurality of transcoders having an associated storage cost, said selecting comprising jointly reducing an overall cost, subject to constraints, wherein said overall cost comprises said associated transcoding cost and said associated storage cost.

15. The apparatus of claim 14, wherein said at least one processor is further operative to transcode said plurality of input data streams in accordance with said transcoding plan to obtain a plurality of actual outputs, said plurality of actual outputs comprising transcoded versions of said plurality of input data streams.

16. The apparatus of claim 14, herein:
said overall cost comprises operational cost;
said selecting is carried out by said at least one processor to improve efficiency of utilization of an existing deployed system comprising said plurality of transcoders and at least one storage resource; and
said constraints comprise storage fidelity and time length constraints.

17. The apparatus of claim 14, wherein:
said overall cost comprises deployment cost;
said selecting is carried out by said at least one processor to determine a required number of said transcoders and a required size of at least one storage resource in a system to be deployed; and
said constraints comprise storage fidelity and time length constraints.

18. The apparatus of claim 14, where said constraints do not include a storage requirement, such that said associated storage costs may be taken as zero, and such that said at least one processor is operative to by jointly reducing said transcoding costs.

19. The apparatus of claim 14, wherein said constraints do not include a transcoding cost requirement, such that said associated transcoding costs may be taken as zero, and wherein said at least one processor is operative to by jointly reducing said storage costs.

20. An apparatus comprising:
means for identifying a plurality of input data streams from a plurality of data sources, said input data streams being in a plurality of different formats; and
means for selecting, for each of said input data streams, one of a plurality of transcoders, to obtain a transcoding plan, each of said plurality of transcoders having an associated transcoding cost, a potential output for each of said plurality of transcoders having an associated storage cost, said selecting comprising jointly reducing an overall cost, subject to constraints, wherein said overall cost comprises said associated transcoding cost and said associated storage cost.

21. The apparatus of claim 20, further comprising means for transcoding said plurality of input data streams in accordance with said transcoding plan to obtain a plurality of actual outputs, said plurality of actual outputs comprising transcoded versions of said plurality of input data streams.

* * * * *